United States Patent
Zhang et al.

(10) Patent No.: US 10,268,515 B2
(45) Date of Patent: Apr. 23, 2019

(54) RELEASING RESOURCES FROM PROCESSES IN A PARTICULAR ORDER TO PROVIDE REQUIRED RESOURCES TO START AN APPLICATION

(71) Applicant: SHELL INTERNET (BEIJING) SECURITY TECHNOLOGY CO., LTD., Beijing (CN)

(72) Inventors: Kangzong Zhang, Beijing (CN); Yong Luo, Beijing (CN); Haiying Yang, Beijing (CN); Chao Xiao, Beijing (CN)

(73) Assignee: SHELL INTERNET (BEIJING) SECURITY TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 15/105,431

(22) PCT Filed: Aug. 15, 2014

(86) PCT No.: PCT/CN2014/084574
§ 371 (c)(1),
(2) Date: Jun. 16, 2016

(87) PCT Pub. No.: WO2015/120708
PCT Pub. Date: Aug. 20, 2015

(65) Prior Publication Data
US 2017/0004013 A1  Jan. 5, 2017

(30) Foreign Application Priority Data

Feb. 14, 2014 (CN) .......................... 2014 1 0052568

(51) Int. Cl.
*G06F 3/06* (2006.01)
*G06F 9/48* (2006.01)
*G06F 9/50* (2006.01)

(52) U.S. Cl.
CPC .......... *G06F 9/5011* (2013.01); *G06F 3/0604* (2013.01); *G06F 3/0647* (2013.01);
(Continued)

(58) Field of Classification Search
CPC .... G06F 3/0604; G06F 3/0647; G06F 3/0673; G06F 9/485; G06F 9/4881; G06F 9/5011
See application file for complete search history.

(56) References Cited

U.S. PATENT DOCUMENTS

2003/0084096 A1 * 5/2003 Starbuck ............. G06F 17/3089
709/203
2004/0023646 A1 * 2/2004 Inami .................... G06F 9/4881
455/418
(Continued)

FOREIGN PATENT DOCUMENTS

CN    102929601 A    2/2013
CN    103019770 A    4/2013
(Continued)

OTHER PUBLICATIONS

Translation of the International Search Report and Written Opinion corresponding to International Patent Application No. PCT/CN2014/084574, dated Nov. 21, 2014, 11 pages.

*Primary Examiner* — James J Lee
*Assistant Examiner* — Jorge A Chu Joy-Davila
(74) *Attorney, Agent, or Firm* — Lathrop Gage LLP

(57) ABSTRACT

Disclosed are a method and a device for managing an application applied in an electronic device, said method comprising: detecting an application installed in the electronic device; determining an application to be managed from a detection result according to a predetermined regulation; creating an application management folder; generating a shortcut identification for the application to be managed in the application management folder; triggering an operation for providing memory resources to the application
(Continued)

to be managed and triggering an operation for starting the application to be managed, after receiving an operation on the shortcut identification from a user. With embodiments of the present disclosure, the starting speed of the application may be improved and the possibility of happening of phenomena such as unsmooth start, runtime error and crashing may be reduced, and the tidiness of the desktop is improved.

14 Claims, 2 Drawing Sheets

(52) U.S. Cl.
CPC ............ *G06F 3/0673* (2013.01); *G06F 9/485* (2013.01); *G06F 9/4881* (2013.01)

(56) References Cited

U.S. PATENT DOCUMENTS

| | | | | |
|---|---|---|---|---|
| 2004/0194089 | A1* | 9/2004 | McCarthy | G06F 9/5011 718/100 |
| 2006/0036650 | A1* | 2/2006 | Ito | G06F 9/468 |
| 2008/0263282 | A1* | 10/2008 | Harada | G06F 12/0804 711/129 |
| 2009/0235271 | A1* | 9/2009 | Utsumi | G06F 9/4418 718/104 |
| 2009/0325565 | A1* | 12/2009 | Backholm | H04M 3/42178 455/419 |
| 2010/0115226 | A1* | 5/2010 | Ueno | G06F 12/023 711/173 |
| 2011/0154374 | A1 | 6/2011 | Ku et al. | |
| 2013/0326166 | A1* | 12/2013 | Desai | G06F 9/5016 711/158 |
| 2014/0123151 | A1* | 5/2014 | Kishan | G06F 9/4881 718/103 |

FOREIGN PATENT DOCUMENTS

| | | |
|---|---|---|
| CN | 103324536 A | 9/2013 |
| CN | 103778007 A | 5/2014 |

* cited by examiner

RELEASING RESOURCES FROM PROCESSES IN A PARTICULAR ORDER TO PROVIDE REQUIRED RESOURCES TO START AN APPLICATION

CROSS REFERENCE TO RELATED APPLICATION

This application is a U.S. national phase application of International Application PCT/CN2014/084574, with an international filing date of Aug. 15, 2014, the entire contents of which are incorporated herein by reference.

TECHNICAL FIELD

The present disclosure generally relates to a field of application processing, and more particularly, to a method for managing an application and a device for managing an application.

BACKGROUND

As the hardware performance of an electronic device improves, more and more applications may be supported by the electronic device. A user always installs multiple applications in the electronic device for his/her use. However, since icons of these applications are often distributed on the desktop directly, the desktop is in an untidy state.

Further, memory resources are occupied when some applications run in the electronic device. If a system cannot release occupied memory resources in time, remaining memory resources are not enough. Thus, when starting an application requiring many memory resources, phenomena such as low starting speed and unsmooth start, even runtime error and crashing will happen due to insufficient memory resources.

SUMMARY

The present disclosure provides a method for managing an application. The method for managing an application is applied in an electronic device, including:
  detecting an application installed in the electronic device;
  determining an application to be managed from a detection result according to a predetermined regulation;
  creating an application management folder;
  generating a shortcut identification for the application to be managed in the application management folder;
  triggering an operation for providing memory resources to the application to be managed and triggering an operation for starting the application to be managed, after receiving an operation on the shortcut identification from a user.
  Preferably, providing memory resources to the application to be managed includes:
  obtaining a size of memory required by starting the application to be managed;
  determining whether remaining memory resources satisfy a memory requirement of starting the application to be managed;
  releasing memory resources to satisfy the memory requirement of starting the application to be managed if the remaining memory resources cannot satisfy the memory resources requirement of starting the application to be managed.
  Preferably, obtaining a size of memory required by starting the application to be managed includes:

searching for the size of memory required by starting the application to be managed in a preset memory requirement list stored locally; or
  sending a memory searching request to a server, and obtaining the size of memory required by starting the application to be managed from the server, in which the memory searching request carries an identification of the application to be managed.
  Preferably, the memory searching request further carries hardware information of the electronic device, and the server determines the size of memory required by starting the application to be managed according to the identification of the application to be managed and the hardware information of the electronic device carried the memory searching request.
  Preferably, releasing memory resources includes:
  releasing memory resources occupied by processes in the electronic device in sequence until the memory requirement of starting the application to be started is satisfied, in which memory resources occupied by a first kind of processes are released first, and memory resources occupied by a second kind of processes are released later, the first kind of processes are processes which will not be restarted by an operating system after exiting, and the second kind of processes are processes which will be restarted by the operating system after exiting.
  Preferably, during releasing memory resources occupied by a first kind of processes, the memory resources occupied by respective processes are released in an order of long to short unused time of respective processes.
  Preferably, during releasing memory resources occupied by a second kind of processes, the memory resources occupied by respective resources are released first in an order of long to short unused time of respective processes, and then in an order of long to short starting periods of the respective processes.
  Preferably, the method further includes:
  monitoring a running state of the application to be managed;
  releasing memory resources occupied by the application to be managed if it is monitored that the application to be managed finishes running.
  Preferably, the method further includes:
  sending an application recommendation request to a server, in which the application recommendation request carries the identification of the application to be managed;
  receiving application recommendation information determined by the server according to the application recommendation request and displaying the application recommendation information to the user.
  The present disclosure provides an electronic device for managing an application. The electronic device, includes: a housing, a displayer, a circuit board and a processor, wherein the circuit board is arranged inside a space enclosed by the housing, the displayer is arranged external to the housing and connected with the circuit board, and the processor is arranged on the circuit board and configured to process data so as to execute following acts of:
  detecting an application installed in the electronic device;
  determining an application to be managed from a detection result according to a predetermined regulation;
  creating an application management folder;
  generating a shortcut identification for the application to be managed in the application management folder;
  triggering an operation for providing memory resources to the application to be managed and triggering an operation for starting the application to be managed, after receiving an operation on the shortcut identification from a user.

The present disclosure provides a non-transitory computer-readable storage medium having stored therein instructions that, when executed by a processor of a device, causes the device to perform a method for managing an application including:

detecting an application installed in the electronic device;

determining an application to be managed from a detection result according to a predetermined regulation;

creating an application management folder;

generating a shortcut identification for the application to be managed in the application management folder;

triggering an operation for providing memory resources to the application to be managed and triggering an operation for starting the application to be managed, after receiving an operation on the shortcut identification from a user.

It can be seen from the above-described that, in the solution, by generating a shortcut identification of an application to be managed in a created application management folder, a management of the application to be managed may be implemented, such that the desktop is tidy and it is convenient for the user to operate. Further, after receiving an operation on the shortcut identification from the user, an operation of providing memory resources for the application to be managed and an operation of starting the application to be managed may be triggered. The memory resources required by starting the application to be managed may be obtained by releasing memory resources when the application to be managed is started, thus effectively improving the starting speed of the application to be managed and reducing the possibility of happening of phenomena such as unsmooth start, runtime error and crashing.

The embodiments of the present disclosure also provide a computer-readable storage medium having stored therein instructions, which when executed by a processor of a device, causes the device to perform a method for managing an application according to embodiments of the present disclosure.

BRIEF DESCRIPTION OF THE DRAWINGS

In order to explain embodiments of the present disclosure or technical solutions in the related art more clearly, the accompanying drawings used in the descriptions of the embodiments of the present disclosure or the technical solutions in the related art will be introduced in the following. Obviously, the accompanying drawings are merely examples of the present disclosure and those skilled in the art may obtain other drawings according to these accompanying drawings without making creative efforts.

DETAILED DESCRIPTION

Reference will now be made in detail to exemplary embodiments, examples of which are illustrated in the accompanying drawings so as to describe the solution of the present disclosure clearly. The implementations set forth in the following description of exemplary embodiments do not represent all implementations consistent with the invention. Other embodiments obtained by those skilled in the art based on embodiments of the present disclosure without making creative efforts are within the scope of the present disclosure.

Figure 1:
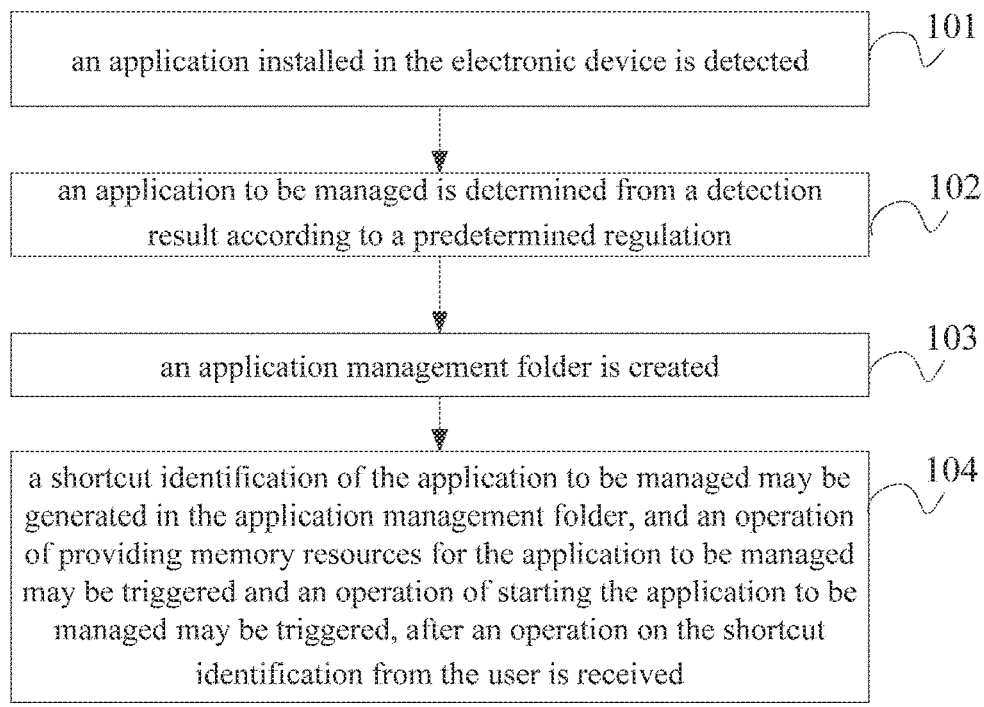
FIG. 1 is a flow chart of a method for managing an application according to an embodiment of the present disclosure.

FIG. 1 is a flow chart of a method for managing an application according to an embodiment. The method is applied in an electronic device and includes the following steps.

In step 101, an application installed in the electronic device is detected.

In step 102, an application to be managed is determined from a detection result according to a predetermined regulation.

In this step, the predetermined regulation may include following forms.

After sequencing memory requirements of applications in the detection result obtained in step S101, first few applications with higher memory requirements are determined as applications to be managed.

Attribute information of each application is obtained from the detection result obtained in step S101. The applications in the detection result are classified according to the attribute information of each application, and some applications selected from each classification are determined as the applications to be managed. For example, the applications in the detection result may be classified according to the attribute information of each application, which are: game applications, office applications, development applications and so on.

The application information in the detection result obtained in step S101 is matched with the application information in an application classification table stored locally to obtain classified information of the applications in the detection result. Classified information of common applications may be stored in the application classification table. The application classification table may be obtained from a server and be stored locally and updated regularly, or may be generated manually in the local.

It should be explained that, the present disclosure is illustrated by taking the above descriptions only as examples, and specific forms of the predetermined regulation are not limited in the present disclosure. In practice, the predetermined regulation may be set in accordance with specific conditions.

S103, an application management folder is created.

In this step, when creating the application management folder, only one folder may be created, or some folders may be created according to the classified information of the applications to be managed, such that the user may manage installed applications.

S104, a shortcut identification of the application to be managed may be generated in the application management folder, and an operation of providing memory resources for the application to be managed may be triggered and an operation of starting the application to be managed may be triggered, after an operation on the shortcut identification from the user is received.

Specifically, the user may trigger the operation of providing memory resources for the application to be managed and the operation of starting the application to be managed by clicking the shortcut identification in the application management folder. When the application to be managed is started in this way, the operation of providing memory resources is triggered firstly and the operation of starting the application to be managed may be triggered secondly, or, the two operations are triggered simultaneously. The operation of providing memory resources for the application to be managed may be performed by steps of determining whether remaining memory resources can satisfy a memory requirement of starting the application to be managed, and indicating that there is no lack of memory resources if the remaining memory resources can satisfy the memory requirement of starting the application to be managed, and indicating that there is a lack of memory resources and memory resources should be released by a memory releasing operation to ensure that the application to be managed may be started normally if the remaining memory resources cannot satisfy the memory requirement of starting the application to be managed.

In a specific embodiment of the present disclosure, the method may further include: monitoring a running state of the application to be managed and releasing memory resources occupied by the application to be managed if it is monitored that the application to be managed finishes running.

In a process of running the application, if occupied memory resources are not released in time, there may be a lack of memory resources, affecting the starting and running of other applications.

In practice, the Android system has a feature of not releasing memory resources occupied by an application after exiting the application. In this situation, if the application in the Android system is managed using the above mentioned application management folder, the memory resources occupied by the application may be released in time, thus avoiding a lack of memory resources to a certain extent.

In another specific embodiment of the present disclosure, the method may further include:

sending an application recommendation request to a server, in which the application recommendation request carries the identification of the application to be managed;

receiving application recommendation information determined by the server according to the application recommendation request and displaying the application recommendation information to the user.

Specifically, the server may classify the applications to be managed according to the identifications of the applications to be managed, and may select related application information to be recommended in the classification. For example, the server determines that the applications to be managed include game applications and office applications by analyzing the identifications of the applications to be managed. Then the server may select game application information and office application information as application information to be recommended, such that the accuracy of recommending information to the user may be improved.

It can be seen from the above-described, in the solution, by generating a shortcut identification of an application to be managed in a created application management folder, a management of the application to be managed may be implemented, such that the desktop is tidy and it is convenient for the user to operate. Further, since an operation of providing memory resources for the application to be managed and an operation of starting the application to be managed may be triggered using the shortcut identification of the application to be managed. The memory resources required by starting the application to be managed may be obtained by releasing memory resources when the application to be managed is started, thus effectively improving the starting speed of the application to be managed and reducing the possibility that the application of happening of phenomena such as unsmooth start, runtime error and crashing.

Figure 2:
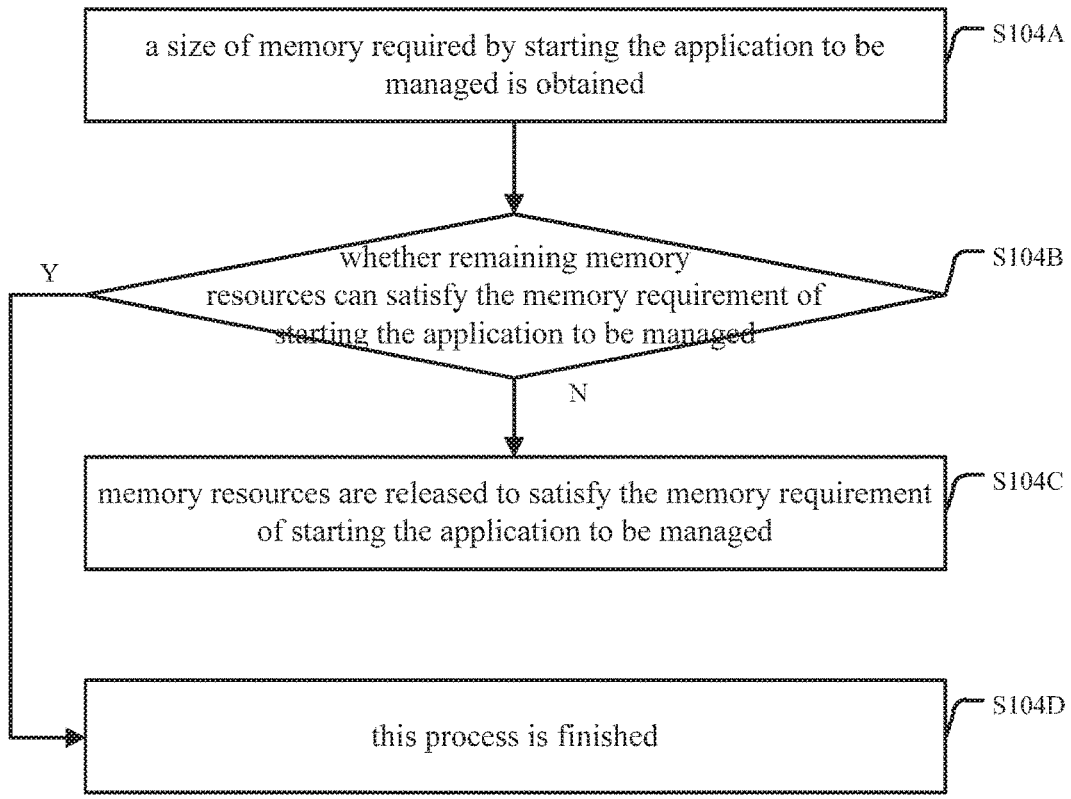
FIG. 2 is a flow chart of a method of providing memory resources for an application to be managed in an embodiment shown in FIG. 1.

In another embodiment of the present disclosure, an implementation of providing memory resources for the application to be managed in step S104 is provided. Referring to FIG. 2, FIG. 2 is a flow chart of a method of providing memory resources for the application to be managed in an embodiment shown in FIG. 1. The method of providing memory resources for the application to be managed include following steps.

In step S104A, a size of memory required by starting the application to be managed is obtained.

In a specific embodiment of the present disclosure, the size of memory required by starting the application to be managed may be obtained from the server by sending a memory searching request to the server.

The memory searching request may carry the identification of the application to be managed. The server may determine the size of memory required by starting the application to be managed according to the identification of the application to be managed.

Further, the memory searching request may carry hardware information of the electronic device. The server may determine the size of memory required by starting the application to be managed according to the identification of the application to be managed and the hardware information of the electronic device carried by the memory searching request. The hardware information of the electronic device may be a size of a screen of the electronic device. If the size of the screen is big, the size of memory required by starting the application to be managed is big. If the size of the screen is small, the size of memory required by starting the application to be managed is small.

It should be noted that, information carried by the memory searching request is not limited in the present disclosure. In practice, the information carried by the memory searching request may be configured in accordance with specific conditions.

In another specific embodiment of the present disclosure, the size of memory required by starting the application to be managed may be searched for in a preset memory requirement list stored locally.

The preset memory requirement list may be a list including memory requirements of multiple applications which is obtained from the server and stored locally. In this situation, the size of memory required by starting the application to be managed may be obtained from the preset memory requirement list according to the identification of the application to be managed.

The preset memory requirement list may be a list for the electronic device which is generated locally according to characteristics of the user. In this situation, the user needs to obtain the size of the memory required to start the application to be managed from the server by sending memory searching request to the server and to update the obtained memory requirement in the memory requirement list when the application to be managed is started for the first time. And when starting the application to be managed again, the user may obtain corresponding information from the memory requirement list preset locally rather than from the server.

In step S104B, it is determined whether remaining memory resources can satisfy a memory requirement of starting the application to be managed, if yes, step S104D is followed, or else step S104C is followed.

In step S104C, memory resources are released to satisfy the memory requirement of starting the application to be managed.

In practice, when releasing the memory resources, the memory resources occupied by processes in the electronic device may be released in sequence until the memory requirement of starting the application to be started is satisfied, in which memory resources occupied by a first kind of processes are released first, and memory resources occupied by a second kind of processes are released later, the first kind of processes will not be restarted by an operating system after exiting, and the second kind of processes will be restarted by the operating system after exiting.

In a process of releasing memory resources occupied by the first kind of processes, the memory resources occupied by respective processes are released in an order of long to short unused time of respective processes.

In a process of releasing memory resources occupied by the second kind of processes, the memory resources occupied by respective resources are released first in an order of long to short unused time of respective processes, and then in an order of long to short starting periods of the respective processes. For example, the restart period of process A is 10 s, the restart period of process B is 20 s, thus memory resources occupied by process B is released firstly.

It should be explained that, in a process of releasing the memory resources, if the memory requirement of starting the application to be managed can be satisfied when memory resources occupied by only part of processes according to the priority, then it only needs to release the memory resources occupied by the part of processes.

In step S104D, this process is finished.

It may be seen from the above-described, in the solution, in the case that the remaining memory resources cannot satisfy the memory requirement of starting the application to be managed, the memory resources are released by releasing the memory resources occupied by processes according to the priority until the memory resources satisfying the memory requirement of starting the application to be managed are obtained, such that the efficiency of releasing the memory resources is improved and the re-startup of some applications may be avoided.

Figure 3:
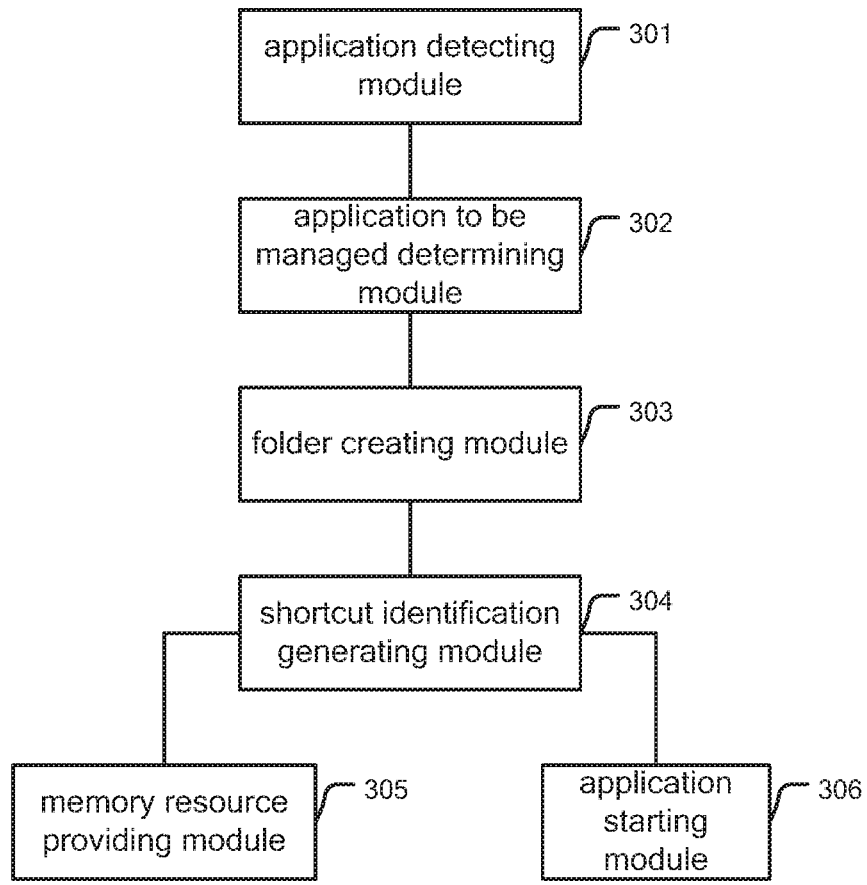
FIG. 3 is a block diagram of a device for managing an application according to an embodiment of the present disclosure.

FIG. 3 is a block diagram of a device for managing an application according to yet another exemplary embodiment of the present disclosure. The device for managing an application is applied in an electronic device and includes an application detecting module 301, an application to be managed determining module 302, a folder creating module 303, a shortcut identification generating module 304, a memory resource providing module 305 and an application starting module 306.

The application detecting module 301 is configured to detect an application installed in the electronic device;

The application to be managed determining module 302 is configured to determine an application to be managed from a detection result according to a predetermined regulation;

The folder creating module 303 is configured to create an application management folder;

The shortcut identification generating module 304 is configured to generate a shortcut identification for the application to be managed in the application management folder;

The memory resource providing module 305 is configured to provide memory resources to the application to be managed after receiving an operation on the shortcut identification from a user;

The application starting module 306 is configured to start the application to be managed after receiving the operation on the shortcut identification from the user.

In a specific embodiment of the present disclosure, the device may further include a running state monitoring module (not shown). The running state monitoring module is configured to: monitor a running state of the application to be managed; and release memory resources occupied by the application to be managed if it is monitored that the application to be managed finishes running.

In another specific embodiment of the present disclosure, the device may further include an application recommendation request sending module and an application recommendation information receiving module (not shown).

Specifically, the application recommendation request sending module is configured to send an application recommendation request to the server, in which the application recommendation request carries the identification of the application to be managed; the application recommendation information receiving module is configured to receive application recommendation information determined by the server according to the application recommendation request and to display the application recommendation information to the user.

It can be seen from the above-described, in the solution, by generating a shortcut identification of an application to be managed in a created application management folder, a management of the application to be managed may be implemented, such that the desktop is tidy and it is convenient for the user to operate. Further, after receiving an operation on the shortcut identification from the user, an operation of providing memory resources for the application to be managed may be triggered, and the operation of starting the application to be managed may be triggered. The memory resources required by starting the application to be managed may be obtained by releasing memory resources when the application to be managed is started, such that the starting speed of the application to be managed may be improved and the possibility of happening of phenomena such as unsmooth start, runtime error and crashing be reduced.

Figure 4:
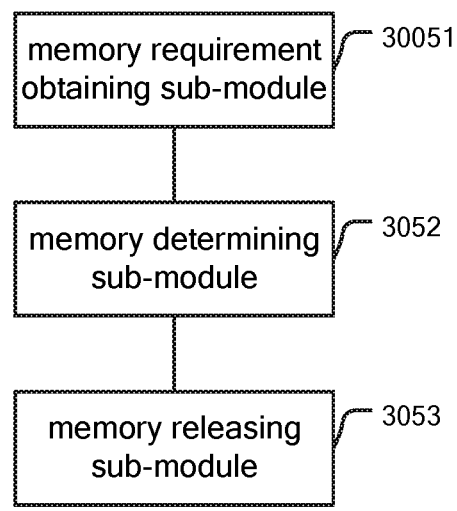
FIG. 4 is a block diagram of a memory resource providing module in an embodiment shown in FIG. 3.

In another embodiment of the present disclosure, an implementation of the memory resource providing module 305 is provided. Referring to FIG. 4, FIG. 4 is a block diagram of a memory resource providing module in an embodiment shown in FIG. 3. The memory resource providing module 305 includes a memory requirement obtaining sub-module 3051, a memory determining sub-module 3052 and a memory releasing sub-module 3053.

The memory requirement obtaining sub-module 3051 is configured to obtain a size of memory required by starting the application to be managed;

The memory determining sub-module 3052 is configured to determine whether remaining memory resources can satisfy a memory requirement of starting the application to be managed;

The memory releasing sub-module 3053 is configured to release memory resources to satisfy the memory requirement of starting the application to be managed if the memory determining sub-module 3052 determines that the remaining memory resources cannot satisfy the memory requirement of starting the application to be managed.

In an embodiment of the present disclosure, the memory requirement obtaining sub-module 3051 is configured to:

searching for the size of memory required by starting the application to be managed in a preset memory requirement list stored locally; or send a memory searching request to a server, and obtain the size of memory required by starting the application to be managed from the server, in which the memory searching request carries an identification of the application to be managed.

Specifically, the memory searching request sent by the memory requirement obtaining sub-module 3051 further carries hardware information of the electronic device, and the server determines the size of memory required by starting the application to be managed according to the identification of the application to be managed and the hardware information of the electronic device carried the memory querying request.

In another embodiment of the present disclosure, the memory releasing sub-module 3053 may include a first releasing unit and a second releasing unit (not shown).

The first releasing unit is triggered first and the second releasing unit is triggered later, and the memory releasing sub-module 3053 is configured to release memory resources occupied by respective processes in the electronic device in sequence until the memory requirement of starting the application to be started is satisfied. The first releasing unit is configured to release memory resources occupied by processes which will not be restarted by an operating system after exiting. The second releasing unit is configured to release memory resources occupied by processes which will be restarted by the operating system after exiting.

Specifically, the first releasing unit is further configured to release the memory resources occupied by respective processes in an order of long to short unused time of respective processes, during releasing memory resources occupied by processes which will not be restarted by an operating system after exiting.

Specifically, the second releasing unit is further configured to release the memory resources occupied by respective processes first in an order of long to short unused time of respective processes, and then in an order of long to short restarting periods of the respective processes, during releasing memory resources occupied by processes which will be restarted by the operating system after exiting.

It can be seen from the above-described, in the solution, in the case that the remaining memory resources cannot satisfy the memory required by starting the application to be managed, the memory resources are released by releasing the memory resources occupied by processes according to the priority until the memory resources satisfying the memory required by starting the application to be managed are obtained, such that the efficiency of releasing the memory resources is improved and the re-startup of some applications may be avoided.

Since the device embodiments are similar to the method embodiments of the present disclosure, the device embodiments are not described in detail. Concerning details not disclosed in the device embodiments of the present disclosure, reference is made to the method embodiments of the present disclosure.

The embodiments of the present disclosure also provide an electronic device for managing an application. The electronic device for managing an application includes a housing, a displayer, a circuit board and a processor, in which the circuit board is arranged inside a space enclosed by the housing, the displayer is arranged external to the housing and connected with the circuit board, and the processor is arranged on the circuit board and configured to process data so as to execute following steps.

In step 101', an application installed in the electronic device is detected.

In step 102', an application to be managed is determined from a detection result according to a predetermined regulation.

In this step, the predetermined regulation may include following forms.

After sequencing memory requirements of applications in the detection result obtained in step S101', first few applications with higher memory requirements are determined as applications to be managed.

Attribute information of each application is obtained from the detection result obtained in step S101'. The applications in the detection result are classified according to the attribute information of each application, and some applications selected from each classification are determined as the applications to be managed. For example, the applications in the detection result may be classified according to the attribute information of each application, which are: game applications, office applications, development applications and so on.

The application information in the detection result obtained in step S101' is matched with the application information in an application classification table stored locally to obtain classified information of the applications in the detection result. Classified information of common applications may be stored in the application classification table. The application classification table may be obtained from a server and be stored locally and updated regularly, or may be generated manually in the local.

It should be explained that, the present disclosure is illustrated by taking the above descriptions only as examples, and specific forms of the predetermined regulation are not limited in the present disclosure. In practice, the predetermined regulation may be set in accordance with specific conditions.

S103', an application management folder is created.

In this step, when creating the application management folder, only one folder may be created, or some folders may be created according to the classified information of the applications to be managed, such that the user may manage installed applications.

S104', a shortcut identification of the application to be managed may be generated in the application management folder, and an operation of providing memory resources for the application to be managed may be triggered and an operation of starting the application to be managed may be triggered, after an operation on the shortcut identification from the user is received.

Specifically, the user may trigger the operation of providing memory resources for the application to be managed and the operation of starting the application to be managed by clicking the shortcut identification in the application management folder. When the application to be managed is started in this way, the operation of providing memory resources is triggered firstly and the operation of starting the application to be managed may be triggered secondly, or, the two operations are triggered simultaneously. The operation of providing memory resources for the application to be managed may be performed by steps of determining whether remaining memory resources can satisfy a memory requirement of starting the application to be managed, and indicating that there is no lack of memory resources if the remaining memory resources can satisfy the memory requirement of starting the application to be managed, and indicating that there is a lack of memory resources and memory resources should be released by a memory releasing operation to ensure that the application to be managed may be started normally if the remaining memory resources cannot satisfy the memory requirement of starting the application to be managed.

In a specific embodiment of the present disclosure, the processor is configured to monitor a running state of the application to be managed and to release memory resources occupied by the application to be managed if it is monitored that the application to be managed finishes running.

In a process of running the application, if occupied memory resources are not released in time, there may be a lack of memory resources, affecting the starting and running of other applications.

In practice, the Android system has a feature of not releasing memory resources occupied by an application after exiting the application. In this situation, if the application in the Android system is managed using the above mentioned application management folder, the memory resources occupied by the application may be released in time, thus avoiding a lack of memory resources to a certain extent.

In another specific embodiment of the present disclosure, the processor is configured to:

send an application recommendation request to a server, in which the application recommendation request carries the identification of the application to be managed;

receive application recommendation information determined by the server according to the application recommendation request and displaying the application recommendation information to the user.

Specifically, the server may classify the applications to be managed according to the identifications of the applications to be managed, and may select related application information to be recommended in the classification. For example, the server determines that the applications to be managed include game applications and office applications by analyzing the identifications of the applications to be managed. Then the server may select game application information and office application information as application information to be recommended, such that the accuracy of recommending information to the user may be improved.

It can be seen from the above-described, in the solution, by generating a shortcut identification of an application to be managed in a created application management folder, a management of the application to be managed may be implemented, such that the desktop is tidy and it is convenient for the user to operate. Further, since an operation of providing memory resources for the application to be managed and an operation of starting the application to be managed may be triggered using the shortcut identification of the application to be managed. The memory resources required by starting the application to be managed may be obtained by releasing memory resources when the application to be managed is started, thus effectively improving the starting speed of the application to be managed and reducing the possibility that the application of happening of phenomena such as unsmooth start, runtime error and crashing.

In another embodiment of the present disclosure, an implementation of providing memory resources for the application to be managed in step S104' is provided. The processor is configured to process the method of providing memory resources for the application to be managed, in which the method includes following steps.

In step S104A', a size of memory required by starting the application to be managed is obtained.

In a specific embodiment of the present disclosure, the size of memory required by starting the application to be managed may be obtained from the server by sending a memory searching request to the server.

The memory searching request may carry the identification of the application to be managed. The server may determine the size of memory required by starting the application to be managed according to the identification of the application to be managed.

Further, the memory searching request may carry hardware information of the electronic device. The server may determine the size of memory required by starting the application to be managed according to the identification of the application to be managed and the hardware information of the electronic device carried by the memory searching request. The hardware information of the electronic device may be a size of a screen of the electronic device. If the size of the screen is big, the size of memory required by starting the application to be managed is big. If the size of the screen is small, the size of memory required by starting the application to be managed is small.

It should be noted that, information carried by the memory searching request is not limited in the present disclosure. In practice, the information carried by the memory searching request may be configured in accordance with specific conditions.

In another specific embodiment of the present disclosure, the size of memory required by starting the application to be managed may be searched for in a preset memory requirement list stored locally.

The preset memory requirement list may be a list including memory requirements of multiple applications which is obtained from the server and stored locally. In this situation, the size of memory required by starting the application to be managed may be obtained from the preset memory requirement list according to the identification of the application to be managed.

The preset memory requirement list may be a list for the electronic device which is generated locally according to characteristics of the user. In this situation, the user needs to obtain the size of the memory required to start the application to be managed from the server by sending memory searching request to the server and to update the obtained memory requirement in the memory requirement list when the application to be managed is started for the first time. And when starting the application to be managed again, the user may obtain corresponding information from the memory requirement list preset locally rather than from the server.

In step S104B', it is determined whether remaining memory resources can satisfy a memory requirement of starting the application to be managed, if yes, step S104D' is followed, or else step S104C' is followed.

In step S104C', memory resources are released to satisfy the memory requirement of starting the application to be managed.

In practice, when releasing the memory resources, the memory resources occupied by processes in the electronic device may be released in sequence until the memory requirement of starting the application to be started is satisfied, in which memory resources occupied by a first kind of processes are released first, and memory resources occupied by a second kind of processes are released later, the first kind of processes will not be restarted by an operating system after exiting, and the second kind of processes will be restarted by the operating system after exiting.

In a process of releasing memory resources occupied by the first kind of processes, the memory resources occupied by respective processes are released in an order of long to short unused time of respective processes.

In a process of releasing memory resources occupied by the second kind of processes, the memory resources occupied by respective resources are released first in an order of long to short unused time of respective processes, and then in an order of long to short starting periods of the respective processes. For example, the restart period of process A is 10 s, the restart period of process B is 20 s, thus memory resources occupied by process B is released firstly.

It should be explained that, in a process of releasing the memory resources, if the memory requirement of starting the application to be managed can be satisfied when memory resources occupied by only part of processes according to the priority, then it only needs to release the memory resources occupied by the part of processes.

In step S104D', this process is finished.

It may be seen from the above-described, in the solution, in the case that the remaining memory resources cannot satisfy the memory requirement of starting the application to be managed, the memory resources are released by releasing the memory resources occupied by processes according to the priority until the memory resources satisfying the memory requirement of starting the application to be managed are obtained, such that the efficiency of releasing the memory resources is improved and the re-startup of some applications may be avoided.

The embodiments of the present disclosure also provide a non-transitory computer-readable storage medium having stored therein instructions, which when executed by a processor of a device, causes the device to perform a method for managing an application according to embodiments of the present disclosure.

It should be explained that, in this specification, terms such as "first" and "second" are only used for distinguishing one element or operation from another, but are not necessarily used for indicating any practical relationship or order between these elements or operations. Further, a term such as "include" and/or "contain" or any variation of the term means "including but not limited to". Therefore, a process, method, object, or device that includes a series of elements not only includes these elements, but also includes other elements that are not specified expressly, or may further include inherent elements of the process, method, object or device. In the case that there are no more limitations, in the context of an element that is specified by "include one . . . ", the process, method, object or device that includes a specified element may include other identical elements.

It can be understood that all or part of the steps in the method of the above embodiments can be implemented by instructing related hardware via programs, the program may be stored in a computer readable storage medium. The computer readable storage medium may be, but is not limited to, ROM/RAM, magnetic disks, or optical disks.

The foregoing descriptions are merely exemplary embodiments of the present disclosure, but are not intended to limit the protection scope of the present disclosure. Any changes, alternatives, and modifications can be made in the embodiments without departing from spirit, principles and scope of the present disclosure.

What is claimed is:

1. A method for application management, wherein the method is applied in an electronic device and the method comprises:
   determining an application to be managed from one or more applications installed in the electronic device according to a predetermined regulation;
   creating an application management folder;
   generating a shortcut identification for the application to be managed in the application management folder;
   managing startup of the application to be managed via, after receiving an operation on the shortcut identification from a user,
      triggering an operation for providing memory resources to the application to be managed, the memory resources being sufficient to satisfy a memory requirement of starting the application to be managed as defined in a memory requirement list, and
      triggering an operation for starting the application to be managed;
   wherein providing memory resources to the application to be managed comprises:
      obtaining a size of memory required by starting the application to be managed;
      determining whether remaining memory resources satisfy a memory requirement of starting the application to be managed;
      releasing memory resources of processes in the electronic device to satisfy the memory requirement of starting the application to be managed when the remaining memory resources cannot satisfy the memory resources requirement of starting the application to be managed, wherein during releasing memory resources, the memory resources are released first in an order of long to short unused time of respective processes, and then in an order of long to short starting periods of the respective processes.

2. The method according to claim 1, wherein obtaining a size of memory required by starting the application to be managed comprises:
   searching for the size of memory required by starting the application to be managed in the memory requirement list, the memory requirement list being a preset memory requirement list stored locally; or
   sending a memory searching request to a server, and obtaining the size of memory required by starting the application to be managed from the server, wherein the memory searching request carries an identification of the application to be managed.

3. The method according to claim 2, wherein the memory searching request further carries hardware information of the electronic device, and the server determines the size of memory required by starting the application to be managed according to the identification of the application to be managed and the hardware information of the electronic device carried the memory searching request.

4. The method according to claim 1, wherein releasing memory resources comprises:
   releasing memory resources occupied by processes in the electronic device in sequence until the size of memory required by starting application to be managed is satisfied, in which memory resources occupied by a first kind of processes are released first, and memory resources occupied by a second kind of processes are released later, the first kind of processes are processes which will not be restarted by an operating system after exiting, and the second kind of processes are processes will be restarted by the operating system after exiting.

5. The method according to claim 4, wherein during releasing memory resources occupied by a first kind of processes, the memory resources occupied by respective processes are released in an order of long to short unused time of respective processes.

6. The method according to claim 1, further comprising:
monitoring a running state of the application to be managed;
releasing memory resources occupied by the application to be managed if it is monitored that the application to be managed finishes running.

7. The method according to claim 1, further comprising:
sending an application recommendation request to a server, wherein the application recommendation request carries the shortcut identification of the application to be managed;
receiving application recommendation information, including a classification of the application to be managed, determined by the server according to the application recommendation request and displaying the application recommendation information to the user.

8. A non-transitory computer-readable storage medium having stored therein instructions that, when executed by a processor of a device, causes the device to perform a method for application management comprising:
determining an application to be managed from one or more applications installed in the electronic device according to a predetermined regulation;
creating an application management folder;
generating a shortcut identification for the application to be managed in the application management folder;
managing startup of the application to be managed via, after receiving an operation on the shortcut identification from a user,
triggering an operation for providing memory resources to the application to be managed, the memory resources being sufficient to satisfy a memory requirement of starting the application to be managed as defined in a memory requirement list, and,
triggering an operation for starting the application to be managed;
wherein providing memory resources to the application to be managed comprises:
obtaining a size of memory required by starting the application to be managed;
determining whether remaining memory resources satisfy a memory requirement of starting the application to be managed;
releasing memory resources of processes in the electronic device to satisfy the memory requirement of starting the application to be managed when the remaining memory resources cannot satisfy the memory resources requirement of starting the application to be managed, wherein during releasing memory resources, the memory resources are released first in an order of long to short unused time of respective processes, and then in an order of long to short starting periods of the respective processes.

9. An electronic device for application management, comprising: a housing, a displayer, a circuit board and a processor, wherein the circuit board is arranged inside a space enclosed by the housing, the displayer is arranged external to the housing and connected with the circuit board, and the processor is arranged on the circuit board and configured to process data so as to execute following acts of:
determining an application to be managed from one or more applications installed in the electronic device and according to a predetermined regulation;
creating an application management folder;
generating a shortcut identification for the application to be managed in the application management folder;
managing startup of the application to be managed via, after receiving an operation on the shortcut identification from a user,
triggering an operation for providing memory resources to the application to be managed, the memory resources being sufficient to satisfy a memory requirement of starting the application to be managed as defined in a memory requirement list, and
triggering an operation for starting the application to be managed;
wherein providing memory resources to the application to be managed comprises:
obtaining a size of memory required by starting the application to be managed;
determining whether remaining memory resources satisfy a memory requirement of starting the application to be managed;
releasing memory resources of processes in the electronic device to satisfy the memory requirement of starting the application to be managed when the remaining memory resources cannot satisfy the memory resources requirement of starting the application to be managed, wherein during releasing memory resources, the memory resources are released first in an order of long to short unused time of respective processes, and then in an order of long to short starting periods of the respective processes.

10. The electronic device according to claim 9, wherein the processor is configured to obtain the size of memory required by starting the application to be managed by acts of:
searching for the size of memory required by starting the application to be managed in the memory requirement list, the memory requirement list being a preset memory requirement list stored locally; or
sending a memory searching request to a server, and obtaining the size of memory required by starting the application to be managed from the server, wherein the memory searching request carries an identification of the application to be managed.

11. The electronic device according to claim 10, wherein the memory searching request further carries hardware information of the electronic device, and the server determines the size of memory required by starting the application to be managed according to the identification of the application to be managed and the hardware information of the electronic device carried the memory searching request.

12. The electronic device according to claim 9, wherein the processor is configured to release memory resources by acts of:
releasing memory resources occupied by processes in the electronic device in sequence until the memory requirement of starting the application to be managed is satisfied, in which memory resources occupied by a first kind of processes are released first, and memory resources occupied by a second kind of processes are released later, the first kind of processes are processes which will not be restarted by an operating system after exiting, and the second kind of processes are processes will be restarted by the operating system after exiting.

13. The electronic device according to claim 12, wherein during releasing memory resources occupied by a second kind of processes, the memory resources occupied by respective resources are released first in an order of long to short unused time of respective processes, and then in an order of long to short starting periods of the respective processes.

14. The electronic device according to claim 9, wherein the processor is configured to execute following acts of:
- monitoring a running state of the application to be managed;
- releasing memory resources occupied by the application to be managed if it is monitored that the application to be managed finishes running.

* * * * *